(12) United States Patent
Agarwal et al.

(10) Patent No.: US 9,857,000 B2
(45) Date of Patent: Jan. 2, 2018

(54) FLEXIBLE PIPE BODY AND METHOD OF PROVIDING SAME

(71) Applicant: GE Oil & Gas UK Limited, Nailsea, Bristol (GB)

(72) Inventors: Krishna Kant Agarwal, Rajasthan (IN); Bihari Lal, Rajasthan (IN); Senthamil Selvan, Tamil Nadu (IN)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 198 days.

(21) Appl. No.: 14/419,891

(22) PCT Filed: Jul. 12, 2013

(86) PCT No.: PCT/EP2013/064846
§ 371 (c)(1),
(2) Date: Feb. 5, 2015

(87) PCT Pub. No.: WO2014/023516
PCT Pub. Date: Feb. 13, 2014

(65) Prior Publication Data
US 2015/0167867 A1 Jun. 18, 2015

(30) Foreign Application Priority Data
Aug. 7, 2012 (EP) .................................... 12179490

(51) Int. Cl.
| | | |
|---|---|---|
| *F16L 11/00* | (2006.01) | |
| *E21B 17/01* | (2006.01) | |
| *F16L 11/08* | (2006.01) | |

(52) U.S. Cl.
CPC .............. *F16L 11/00* (2013.01); *E21B 17/01* (2013.01); *F16L 11/083* (2013.01); *Y10T 29/49435* (2015.01)

(58) Field of Classification Search
USPC .......................................... 138/135, 131, 39
See application file for complete search history.

(56) References Cited

U.S. PATENT DOCUMENTS

| | | | | |
|---|---|---|---|---|
| 680,984 A | * | 8/1901 | Schoen | F16L 11/16 138/136 |
| 1,530,324 A | * | 3/1925 | Pribil | F01N 1/12 138/135 |

(Continued)

FOREIGN PATENT DOCUMENTS

FR 2930622 A1 10/2009

OTHER PUBLICATIONS

International Search Report and Written Opinion of the International Searching Authority, dated Aug. 21, 2013, for corresponding International Application No. PCT/EP2013/064846, 9 pages.

(Continued)

*Primary Examiner* — James Hook
(74) *Attorney, Agent, or Firm* — Klarquist Sparkman, LLP (57) ABSTRACT

A flexible pipe body and method of producing a flexible pipe body are disclosed. The flexible pipe body includes a collapse resistant layer comprising a radially inner surface and a radially outer surface, the radially inner surface comprising, in cross section, a substantially flat portion and at least one cavity extending from the flat portion radially outwards, and the radially inner surface further comprising, in cross section, at least one aerodynamic feature extending from the flat portion for breaking up a boundary layer of fluid flowing along the flexible pipe body in use.

7 Claims, 4 Drawing Sheets

(56) References Cited

U.S. PATENT DOCUMENTS

| | | | | |
|---|---|---|---|---|
| 2,402,497 | A * | 6/1946 | Johnson | F16L 11/16 138/135 |
| 3,000,401 | A * | 9/1961 | Ringleb | B64C 21/02 138/39 |
| 3,022,049 | A * | 2/1962 | Abbott | F28F 1/124 165/109.1 |
| 3,682,203 | A * | 8/1972 | Foti | F16L 11/16 138/135 |
| 4,402,346 | A * | 9/1983 | Cheetham | F16L 11/083 138/103 |
| 5,645,110 | A * | 7/1997 | Nobileau | F16L 9/147 138/102 |
| 5,669,420 | A * | 9/1997 | Herrero | B21C 37/121 138/122 |
| 6,155,303 | A * | 12/2000 | Krawietz | F01N 13/1816 138/121 |
| 6,216,644 | B1 * | 4/2001 | Eroglu | F15D 1/0045 122/406.3 |
| 7,318,454 | B2 | 1/2008 | Dupoiron | |
| 2001/0025665 | A1 * | 10/2001 | Fukui | F24F 13/0218 138/129 |
| 2002/0195157 | A1 * | 12/2002 | Foti | F16L 11/16 138/135 |
| 2003/0070719 | A1 | 4/2003 | Espinasse et al. | |
| 2012/0180991 | A1 * | 7/2012 | Viswanathan | F28F 1/40 165/104.14 |
| 2014/0318657 | A1 * | 10/2014 | Bixler | F15D 1/003 138/39 |
| 2015/0219253 | A1 * | 8/2015 | Clements | F16L 11/083 138/121 |
| 2015/0252920 | A1 * | 9/2015 | Farnes | F16L 11/083 138/135 |

OTHER PUBLICATIONS

International Preliminary Report on Patentability and Written Opinion of the International Searching Authority, dated Feb. 19, 2015, for corresponding International Application No. PCT/EP2013/064846, 6 pages.

Office Action from the State Intellectual Property Office of the People's Republic of China, for Chinese Patent Application No. 201380041420.8, dated Nov. 18, 2015, 12 pages.

* cited by examiner

FLEXIBLE PIPE BODY AND METHOD OF PROVIDING SAME

CROSS REFERENCE TO RELATED APPLICATIONS

This is the U.S. National Stage of International Application No. PCT/EP2013/064846, filed Jul. 12, 2013, which in turn claims the benefit of European Patent No. EP12179490.3, filed Aug. 7, 2012.

The present invention relates to a flexible pipe body and a method of providing a flexible pipe body. In particular, but not exclusively, the present invention relates to a flexible pipe body having an inner collapse resistant layer with improved performance in terms of fluid flow through the pipe body compared to known designs.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Figure 1:
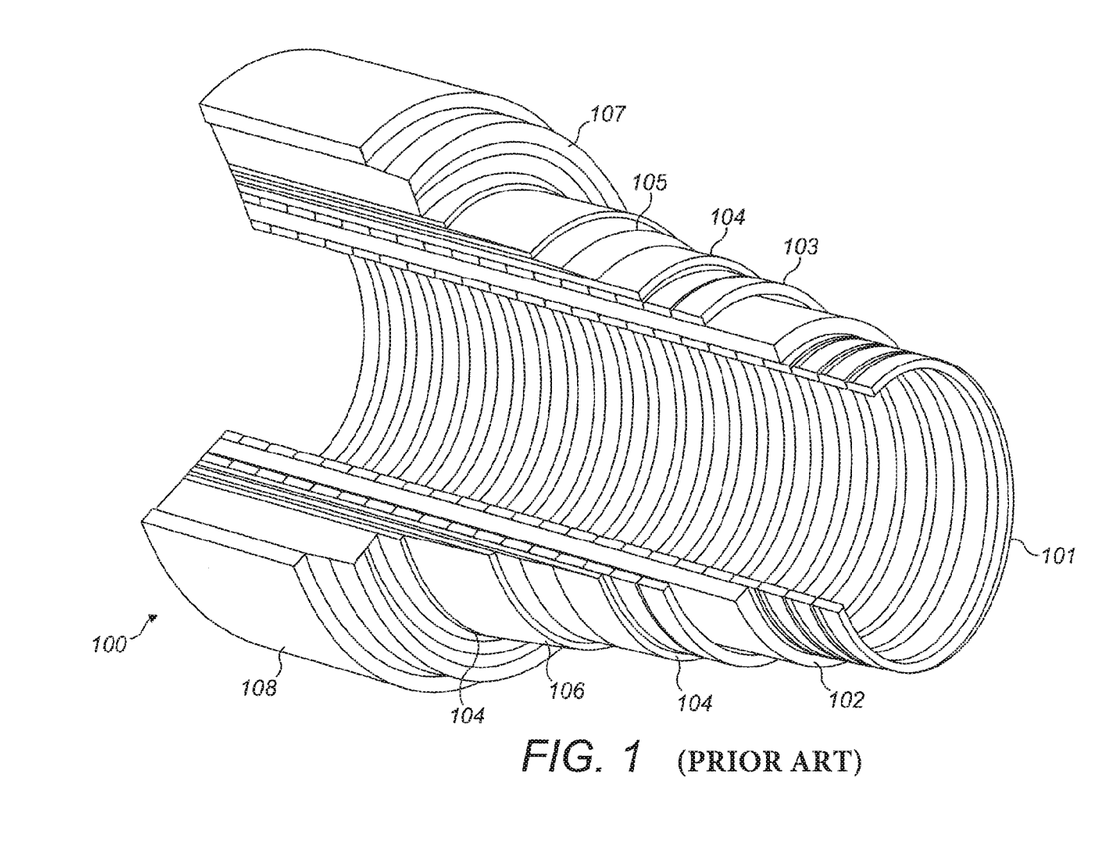
FIG. 1 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 may be formed from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. The layer thicknesses are shown for illustrative purposes only.

Figure 3:
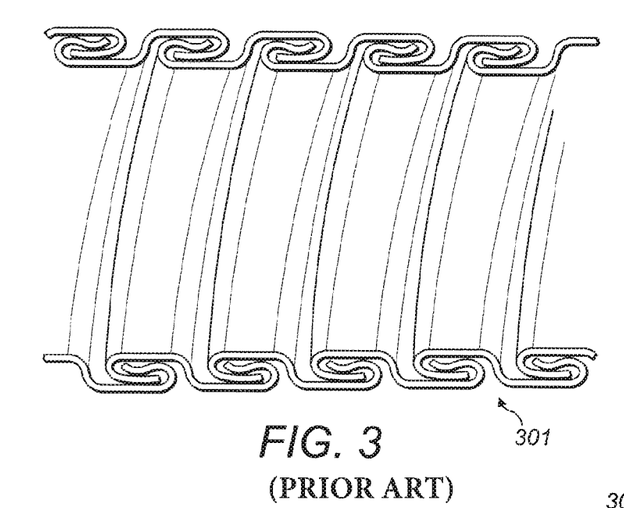
FIG. 3 illustrates a cut away view of a known carcass layer.
Figure 4:
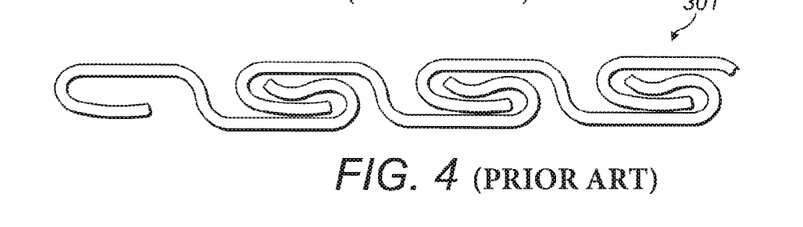
FIG. 4 illustrates a cross sectional view of the carcass layer of FIG. 3.

As illustrated in FIG. 1, a pipe body includes an innermost carcass layer 101 as a collapse resistant layer. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer may be formed from a helically wound elongate metallic tape element, where windings are interlocked with adjacent windings to form the interlocked construction. A cut away illustration of a known carcass layer 301 is shown in FIG. 3. FIG. 4 shows a longitudinal cross sectional view through a wall of the carcass layer 301. Such a carcass layer may be formed by folding an elongate strip of stainless steel, for example, with a rectangular cross section, to have an approximate reverse S-shaped cross section, and winding the strip helically such that a first hooked portion locates over and nests into a corresponding hooked portion of an adjacent winding. As shown in FIG. 4, the dimensions of the hooked regions may allow for a degree of movement between adjacent windings in the axial direction. The movement may be beneficial in allowing a predetermined amount of bending of the flexible pipe.

Referring back to FIG. 1, the internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
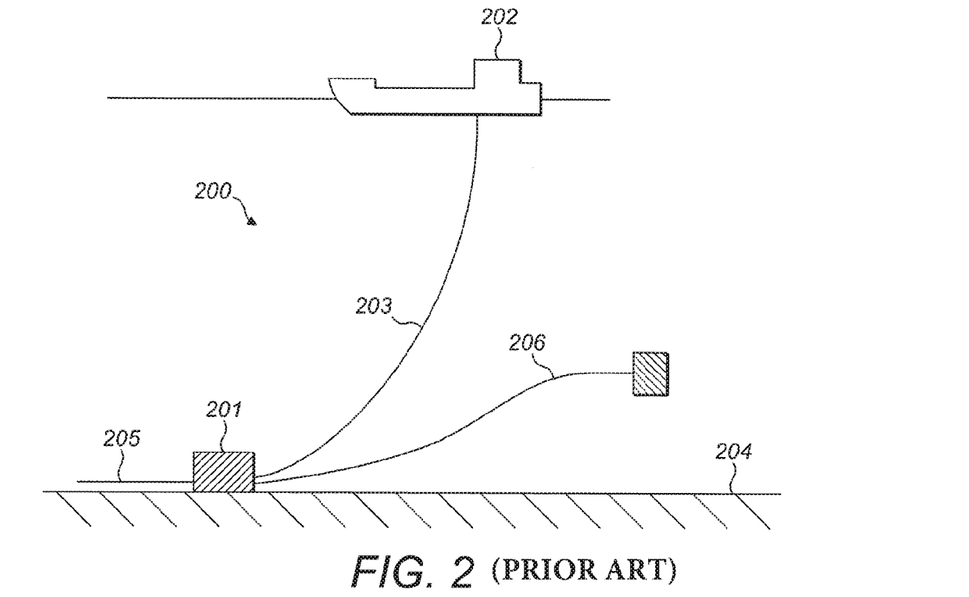
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

Flexible pipe may also be used for shallow water applications (for example less than around 500 meters depth) or even for shore (overland) applications.

As mentioned above, rough bore and smooth bore flexible pipes are known. Smooth bore flexible pipe includes a fluid retaining layer called a liner. A smooth inner surface of the liner defines a bore along which fluid is transported. Smooth bore flexible pipes are used in various applications, such as for water injection, or for shallow water applications. However, on occasion when a bore is depressurised an accumulated pressure in an annulus region of the flexible pipe between the liner and a radially outer layer can cause the liner to collapse and this leads to irreversible damage. Therefore in some applications where collapse resistance is important, a carcass layer is used inside the fluid retaining layer. This is a so-called rough bore application and the carcass layer, which is often formed by helically winding shaped strips in an interlocked fashion as shown in cross section in FIG. 3, prevents collapse of the fluid retaining layer under depressurisation of the bore by supporting the fluid retaining layer.

Known carcass layers generally give a less smooth finish to the inner surface of the pipe body, which can adversely affect fluid flow through the pipe.

A problem which is experienced with rough bore applications is that the interlocked shaped strip of a carcass layer has a detrimental effect upon the flow of fluid along the flexible pipe. Effectively the irregular inner surface of the carcass leads to the formation of vortices in the fluid flow which can give rise to pressure variations. These pressure variations can cause problems particularly when resonance occurs. These pressure fluctuations and vibrations which are generated can cause damage and ultimately failure to ancillary equipment connected to a flexible pipe. The term vortex induced vibration (VIV) has been coined in the art to describe the phenomenon which results in such problems.

More specifically, the pressure variations generated within a flexible pipe can be heard as sharp acoustic tones known as "singing". The pressure variations lead to pipe vibration and alternating stresses along the pipe. This problem has been found to occur at relatively higher fluid export velocities through the riser. As such, if singing occurs, the productions rates have to be limited.

The singing problem can be attributed to flow induced pulsations that are generated on the inner surface of the flexible pipe. When the vortex shedding frequency excites the acoustic natural frequency of the pipeline, resonance between structural vibrations, standing acoustical waves and vortex shedding appear. There are 3 aspects related to the singing problem—(i) vortex shedding in carcass cavities (ii) acoustic energy reflected from pipe ends and (iii) feed-back between acoustic field and fluid flow.

Those skilled in the art have been working to try and "smooth out" the inner surface of the carcass layer in various ways in an attempt to try and reduce fluid flow vortices and riser singing.

According to a first aspect of the present invention there is provided a flexible pipe body for transporting fluids from a sub-sea location, comprising:

a collapse resistant layer comprising a radially inner surface and a radially outer surface, the radially inner surface comprising, in cross section, a substantially flat portion and at least one cavity extending from the flat portion radially outwards, and the radially inner surface further comprising, in cross section, at least one aerodynamic feature extending from the flat portion for breaking up a boundary layer of fluid flowing along the flexible pipe body in use.

According to a second aspect of the present invention there is provided a method of providing a flexible pipe body, comprising:

providing a collapse resistant layer comprising a radially inner surface and a radially outer surface, the radially inner surface comprising, in cross section, a substantially flat portion and at least one cavity extending from the flat portion radially outwards, and the radially inner surface further comprising, in cross section, at least one aerodynamic feature extending from the flat portion for breaking up a boundary layer of fluid flowing along the flexible pipe body in use.

According to a third aspect of the present invention there is provided a flexible pipe body substantially as herein described with reference to the drawings.

According to a fourth aspect of the present invention there is provided a method substantially as herein described with reference to the drawings.

Certain embodiments of the invention provide the advantage that a flexible pipe body is provided that has great collapse resistance, yet prevents or reduces vortex induced vibrations compared to known pipe body designs.

Certain aspects of the invention provide a flexible pipe structure that gives superior free flow of fluids through its bore in use compared to known pipe structures.

Embodiments of the invention are further described hereinafter with reference to the accompanying drawings, in which.

In the drawings like reference numerals refer to like parts.

The present inventors have performed a 2-D LES CFD simulation (2-Dimensional Large Eddy Simulation Computational Fluid Dynamics) to identify shear layer oscillations in the flow of fluid travelling along a flexible pipe. In particular, the inventors have studied the fluid flow along the longitudinal direction of the bore of a flexible pipe by viewing a 2-dimensional cross-section though a flexible pipe during fluid transport. As used herein, the term shear layer will be used to denote an interface between portions of flowing fluid where a large velocity gradient is present (for example from a flow velocity of 30 m/s down to zero within the carcass interstices). A skilled person will realise that fluid flowing along the bore of a pipe will have a portion of fluid adjacent the pipe wall that is subject to shear forces, thus causing a more turbulent flow (vorticity) with fluid flowing at different velocities. Another portion of fluid, generally in the central portion of the pipe, will be relatively unaffected by forces from the pipe wall. In particular, when an inner surface of a pipe is not smooth the vorticity may be great. The boundary between the area that is affected by shear forces and the area that is unaffected by shear forces is termed the boundary layer.

Figure 5:
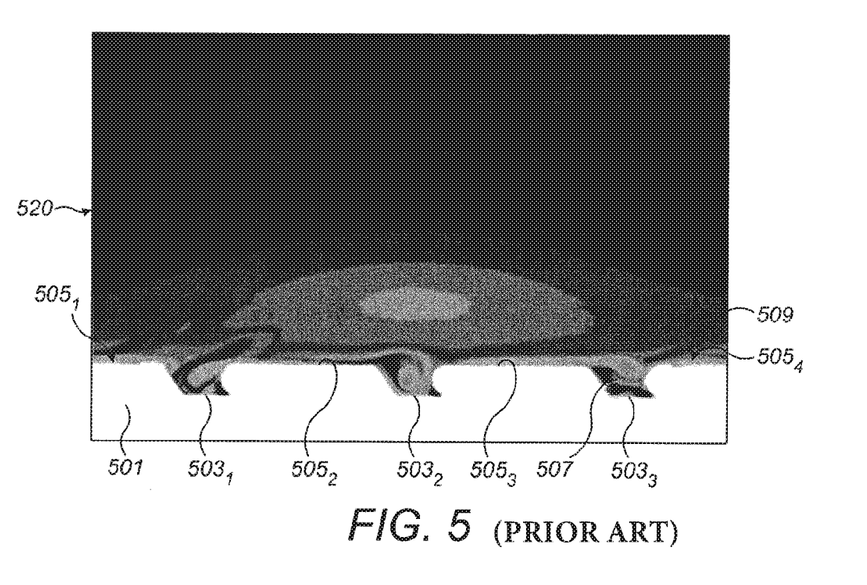
FIG. 5 illustrates fluid flow through a known flexible pipe body.
Figure 6:
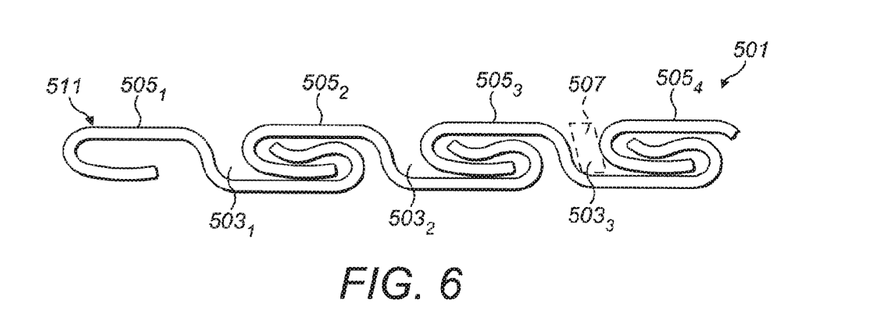
FIG. 6 illustrates a cross sectional view of the carcass layer of FIG. 5.

FIG. 5 illustrates vorticity contours of fluid flowing from left to right as shown in the diagram along the bore 520 of a flexible pipe. Whilst of course a longitudinal cross section through a pipe will show two walls of the pipe enclosing a pipe bore, only one wall of the carcass layer 501 and a part of the bore is shown in the figure. In this case the flexible pipe body tested includes a known carcass layer 501 with a cross sectional profile as shown in FIG. 6 (the same as that shown in FIG. 4).

The carcass layer 501 was formed from a helically wound elongate metallic tape element, where windings are interlocked with adjacent windings to form the interlocked tubular construction. The carcass layer 501 was formed by folding an elongate strip of stainless steel, for example, with a rectangular cross section, to have an approximate reverse S-shaped cross section, with a first end folded over to form a first hooked portion and a second end folded in the opposite direction to form a second hooked portion, and a diagonally formed central body portion. The strip was helically wound such that the first hooked portion locates over and nests into a corresponding valley of the second hooked portion of an adjacent winding. As per FIG. 4, the dimensions of the hooked regions allow for a degree of movement between adjacent windings in the axial direction.

Because of the particular cross-sectional profile of the carcass layer 501, there exists a plurality of substantially flat portions $505_{1-4}$ and cavities $503_{1-3}$ forming the radially inner surface 511 of the carcass layer 501. The cavities are a void area of unfilled space and effectively extend radially outwardly in an approximate rhomboid-type shape 507 in cross section (shown in dotted lines in FIG. 6). Of course the cavities shown in the cross section will actually be a single cavity that helically extends continuously around the inner surface of the carcass layer.

The different areas of shading shown in the bore 520 of FIG. 5 illustrate fluid flowing along the bore at different velocities. It can be seen that the fluid flow is affected by the presence of the cavities $503_{1-3}$, which create vortices of fluid flow as fluid enters and leaves the cavities. The result is a turbulent fluid flow along the carcass inner surface to the boundary layer 509. It is this turbulent fluid flow that can lead to VIVs and riser singing, as discussed above.

Figure 7:
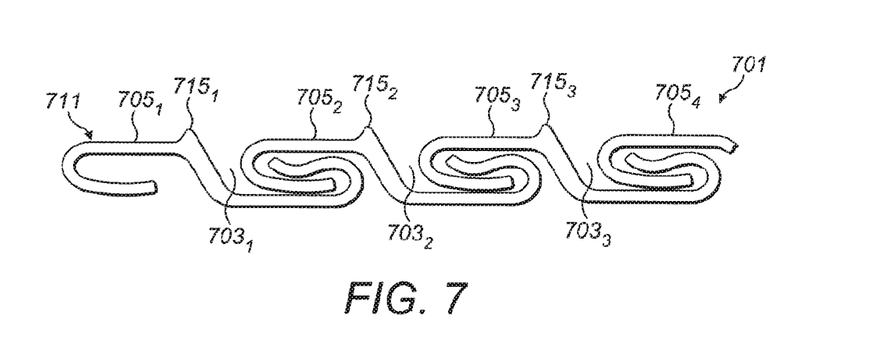
FIG. 7 illustrates a cross section of a carcass layer of the present invention.

FIG. 7 illustrates a cross section of a carcass layer 701 according to the present invention. It can be seen that the carcass layer is similar in some respects to the carcass layer 501 described above and for brevity the same features will not be discussed. However, the carcass layer 701 includes protrusions $715_{1-3}$ formed on portions of the radially inner surface 711 of the layer. The protrusions $715_{1-3}$ are an aerodynamic feature formed as an approximate semi-circle or hump extending from a respective substantially flat portion $705_{1-3}$ of the carcass layer. Of course, when not looking at a cross section, the protrusions shown will actually be a single protrusion that helically extends continuously around the inner surface of the carcass layer.

The protrusions $715_{1-3}$ are formed integrally with the carcass layer, i.e. an integral part of the carcass layer. As such the aerodynamic feature is unitary with the collapse resistant layer.

As shown in the figure, the protrusion 715 is provided at an end of the substantially flat portion 705, adjacent the cavity 703. The protrusion 715 may be formed during manufacture of the elongate tape element feed sheet as an integral portion of the tape element feed sheet (for example by using a specifically textured surface on a roll or set of rolls used to thin, elongate and form the tape element), which is then bent into the appropriate shape as shown in the figure.

The tape element is metallic, entirely of stainless steel in this example.

Aptly the protrusion has a height of between about $\frac{1}{50}^{th}$ and one quarter the depth of the cavity. The height of the protrusion would be measured from the base at the substantially flat surface 705 to its peak. The depth of the cavity would be measured from the same point at the substantially flat surface to the base (the inner edge of the other hook portion). More aptly, the protrusion has a height of between about $\frac{1}{10}^{th}$ and $\frac{1}{15}^{th}$ the depth of the cavity, and more aptly the protrusion has a height of about $\frac{1}{12}^{th}$ the depth of the cavity.

Aptly the protrusion has a height of greater than 200 μm. Aptly the protrusion has a height of less than 1.5 mm.

Aptly the cavity has a depth of around 2.5 mm. In this case the protrusion may aptly have a height between 0.208 mm and 0.833 mm.

The protrusion 715 is provided to be upstream of the cavity 703 when the pipe body is in use transporting fluid. The protrusion is arranged to break up the boundary layer of fluid flowing along the flexible pipe body.

Figure 8:
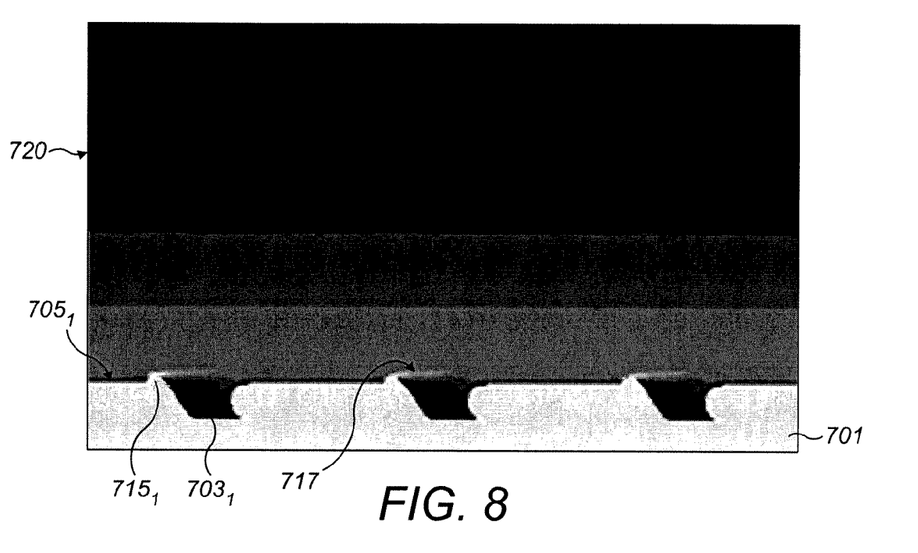
FIG. 8 illustrates fluid flow through a flexible pipe body including the carcass layer of FIG. 7.
Figure 9:
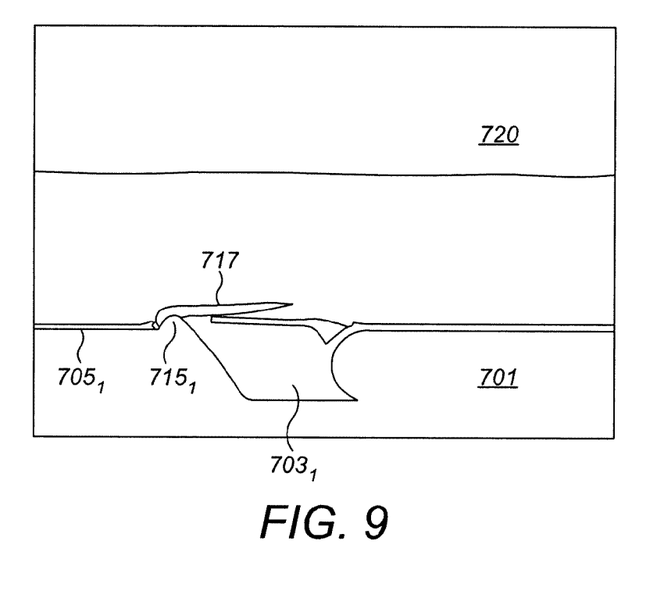
FIG. 9 illustrates an enlarged view of a portion of FIG. 8.

FIG. 8 illustrates vorticity contours using a 2-D LES CFD simulation of fluid flowing from left to right as shown in the diagram along the bore 720 of a flexible pipe. Again only one wall of the carcass layer 701 and a part of the bore is shown in the figure. In this case the flexible pipe body tested includes the carcass layer 701 with a cross sectional profile as shown in FIG. 7. FIG. 9 illustrates an enlarged view of the area around a protrusion $715_1$.

From FIGS. 8 and 9 it can be seen that the turbulence and vorticity of fluid adjacent the wall of the pipe body (carcass layer) is very much reduced compared to the known structure shown in FIG. 5. The fluid flow is more laminar compared to FIG. 5. The fluid flowing along the pipe body is affected in the region of the protrusion, creating a tail of vortices 717. The tail 717 acts to effectively cover over the main part of the cavity 703 such that fluid is not directed directly into the cavity 703. As such the resulting flow pattern is improved, since it is mainly fluid flowing into the cavities that creates the most turbulent flow patterns.

Figure 10A:
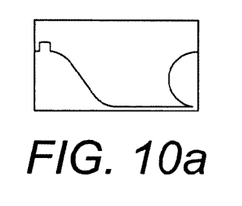
FIGS. 10a, 10b and 10c illustrate portions of various alternative carcass layers.
Figure 10B:
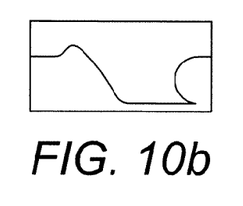
Figure 10C:
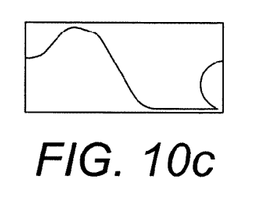

Various modifications to the detailed designs as described above are possible. For example, although the protrusions 715 have been described above as generally semi-circular, the protrusions may take any shape, e.g. as rectangular (as shown in FIG. 10a) or oval or triangular, or a polygon or other convex protrusion or concave depression, or be of different sizes relative to the depth of the cavity (as shown in FIGS. 10b and 10c). The protrusion may be any suitable ridge or convexity formed so as to help break up the boundary layer and reduce vorticity in fluid flowing through the pipe body. For a semi-circular or oval shaped protrusion, the radius of curvature of the protrusion may be predetermined to give a suitable effect on the fluid flow.

Although the protrusion has been described to be located at the end of the substantially flat portion on the inner surface of the carcass layer, the protrusion may be part way along the substantially flat portion. The inner surface of the carcass layer should be investigated and in particular the relative lengths of the substantially flat portions and the cavities determined so as to optimise the tail provided by the aerodynamic feature so as to substantially prevent fluid from directly entering the cavities.

Although the embodiment of FIG. 7 has protrusions formed integrally with the collapse resistant layer, the protrusion may be fixedly attached to a regular collapse resistant layer, during manufacture of the tape element (prior to winding), e.g. by welding or adhering with suitable adhesive, by bolting on, or other method.

Although the aerodynamic feature for breaking up the boundary layer above has been described as one or more protrusions, it is also possible for the carcass layer to have a depression or hollow incorporated into the radially inner surface for breaking up the boundary layer. The depression should be formed so as to cause fluid flow to be directed away from cavities. Thus, the aerodynamic feature is configured to cause fluid flow along the pipe body to be directed away from a cavity of the collapse resistant layer.

Any of the above variations may be used in combination, for example as a series of features for breaking the boundary layer. The dimensions of the aerodynamic feature may change along the length of the pipe body.

Although the carcass layer described above has been described to include helical windings of an elongate tape element, the carcass layer may be formed in other manners. For example, the carcass layer may be formed from a plurality of discrete annular elements that have connecting portions so as to interlock with adjacent annular elements. The adjacent annular elements may have one or more cavity extending from the inner surface of the carcass layer, such as at the point between adjacent annular elements, or in other areas of the inner surface of the carcass layer.

Although the carcass layer described above is of stainless steel, the carcass layer could be formed from any suitable material, e.g. carbon steel, other metal, composite, polymer, or other material, or a combination of materials.

With the above-described arrangement it has been found that the provision of the protrusion or other aerodynamic feature on the innermost layer of pipe body is effective to reduce shear layer oscillations and vorticity of fluid flowing through the pipe body compared to known designs. As such, the overall velocity and pressure oscillations at the cavity face are greatly reduced in amplitude and severity leading to improved flow with no risk of high frequency vibrations causing a risk of fatigue failure of pipe components or equipment in the locality compared to the known design. This leads to smaller amplitude of shear layer flow oscillations and weaker acoustic sources, reducing or eliminating acoustic pulsation at the flow velocities typical in gas production.

That said, the provision of the aerodynamic feature is intended to intentionally disrupt the fluid flow along the flexible pipe. This actually reduces shear layer oscillations and vorticity of the fluid.

The physical location of shear layer oscillations associated with the carcass layer are also moved further from the cavity, thus avoiding impingement of fluid vortices with the cavity.

The invention described above should therefore help in the prevention of unwanted riser singing, which will in turn improve fatigue life and increase the lifetime of a flexible pipe.

Reduction in shear layer oscillations may also lead to a lesser pressure drop in fluid flow through a flexible pipe. Increased production rates through the pipe may therefore be possible.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Flexible pipe body for transporting fluids from a sub-sea location, comprising:
   a collapse resistant layer comprising a radially inner surface and a radially outer surface, the radially inner surface comprising, in cross section, a substantially flat portion and at least one cavity extending from the flat portion radially outwards, and the radially inner surface further comprising, in cross section, at least one protrusion extending from the flat portion for breaking up a boundary layer of fluid flowing along the flexible pipe body in use;
   wherein the collapse resistant layer is a carcass layer;
   wherein the or each at least one protrusion is provided upstream of the or each at least one cavity in terms of a flow direction of fluid through the pipe body in use;

wherein the at least one protrusion is formed integrally with the collapse resistant layer
wherein the collapse resistant layer comprises a helically wound elongate tape element and the at least one cavity is between adjacent windings of the tape element;
wherein the at least one protrusion helically extends continuously around the inner surface of the carcass layer.

2. Flexible pipe body as claimed in claim 1 wherein the protrusion has a height of between about $1/50$th to about $1/4$ the depth of the cavity.

3. Flexible pipe body as claimed in claim 2 wherein the protrusion has a height of between about $1/10$th and $1/15$th the depth of the cavity.

4. Flexible pipe body as claimed in claim 1, further comprising a barrier layer, a hoop strength layer and an outer fluid-retaining layer provided radially outwards of the collapse resistant layer.

5. Use of the flexible pipe body as claimed in claim 1 for the transportation of production fluids from a sub-sea location.

6. A method of providing a flexible pipe body, comprising:
forming an elongate tape element and helically winding the tape element to form a collapse resistant layer comprising a radially inner surface and a radially outer surface, the radially inner surface comprising, in cross section, a substantially flat portion and at least one cavity extending from the flat portion radially outwards, and the radially inner surface further comprising, in cross section, at least one protrusion extending from the flat portion for breaking up a boundary layer of fluid flowing along the flexible pipe body in use;
wherein the collapse resistant layer is a carcass layer;
wherein the or each at least one protrusion is provided upstream of the or each at least one cavity in terms of a flow direction of fluid through the pipe body in use;
wherein the at least one protrusion is formed integrally with the collapse resistant layer;
wherein the at least one protrusion helically extends continuously around the inner surface of the carcass layer.

7. A method as claimed in claim 6, further comprising providing a barrier layer, a hoop strength layer and an outer fluid-retaining layer provided radially outwards of the collapse resistant layer.

* * * * *